US009595228B2

(12) United States Patent
Kwon et al.

(10) Patent No.: US 9,595,228 B2
(45) Date of Patent: Mar. 14, 2017

(54) PIXEL ARRAY AND ORGANIC LIGHT EMITTING DISPLAY DEVICE INCLUDING THE SAME

(71) Applicant: Samsung Display Co., Ltd., Yongin-si, Gyeonggi-do (KR)

(72) Inventors: Oh-Jo Kwon, Yongin-si (KR); Joo-Hyung Lee, Yongin-si (KR); Won-Tae Choi, Yongin-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/009,707

(22) Filed: Jan. 28, 2016

(65) Prior Publication Data

US 2016/0163251 A1 Jun. 9, 2016

Related U.S. Application Data

(63) Continuation of application No. 13/912,528, filed on Jun. 7, 2013.

(30) Foreign Application Priority Data

Nov. 30, 2012 (KR) ........................ 10-2012-0138195

(51) Int. Cl.
*G09G 3/30* (2006.01)
*G06F 3/038* (2013.01)
(Continued)

(52) U.S. Cl.
CPC ......... *G09G 3/3275* (2013.01); *G09G 3/2003* (2013.01); *G09G 3/3208* (2013.01);
(Continued)

(58) Field of Classification Search
CPC ................. G09G 3/006; G09G 3/3225; G09G 2300/0809; G09G 2310/0297;
(Continued)

(56) References Cited

U.S. PATENT DOCUMENTS

2006/0273997 A1 12/2006 Nathan et al.
2007/0164959 A1 7/2007 Childs
(Continued)

FOREIGN PATENT DOCUMENTS

KR 10-2008-0007254 1/2008
KR 10-0846970 7/2008
KR 10-2009-0129336 12/2009

*Primary Examiner* — Nelson Rosario
(74) *Attorney, Agent, or Firm* — Robert E. Bushnell, Esq.

(57) ABSTRACT

A pixel array and an organic light emitting display device including the same, can display an image with uniform luminance by compensating for a variation in threshold voltage/mobility of a driving transistor for each pixel and compensating for a change in efficiency due to degradation of an organic light emitting diode. A first pixel among the pixel array includes an organic light emitting diode; a pixel circuit positioned among an anode electrode of the organic light emitting diode, a first scan line and a first data line through which a data signal is supplied to the first pixel, and controlling current flowing in the organic light emitting diode; and a switching element controlling the coupling between a second data line through which a data signal is supplied to a second pixel of the plurality of pixels and the anode electrode of the organic light emitting diode.

9 Claims, 8 Drawing Sheets

(51) Int. Cl.
*G09G 3/32* (2016.01)
*G09G 3/20* (2006.01)

(52) U.S. Cl.
CPC ............... *G09G 2300/0819* (2013.01); *G09G 2310/0262* (2013.01); *G09G 2320/043* (2013.01); *G09G 2320/045* (2013.01)

(58) Field of Classification Search
CPC ... G09G 2320/0285; G09G 2320/0295; G09G 2360/16
USPC .. 345/76, 77, 78, 79, 80, 81, 82, 83, 44, 45, 345/46, 94, 98, 99, 100, 204–214; 315/169.3, 169.1
See application file for complete search history.

(56) References Cited

U.S. PATENT DOCUMENTS

| | | | |
|---|---|---|---|
| 2008/0036703 | A1 | 2/2008 | Wang et al. |
| 2008/0252568 | A1 | 10/2008 | Kwon |
| 2009/0309818 | A1 | 12/2009 | Kim |
| 2011/0279484 | A1 | 11/2011 | Han et al. |
| 2012/0019500 | A1 | 1/2012 | Hwang et al. |
| 2012/0127220 | A1 | 5/2012 | Noguchi |

PIXEL ARRAY AND ORGANIC LIGHT EMITTING DISPLAY DEVICE INCLUDING THE SAME

CROSS-REFERENCE TO RELATED APPLICATIONS AND CLAIM OF PRIORITY

This application is a continuation application of the prior application Ser. No. 13/912,528 filed in the U.S. Patent & Trademark Office on 7 Jun. 2013 and assigned to the assignee of the present invention. Furthermore, this application makes reference to, incorporates the same herein, and claims all benefits accruing under 35 U.S.C. §119 from an application earlier filed in the Korean Intellectual Property Office on 30 Nov. 2012 and there duly assigned Serial No. 10-2012-0138195.

BACKGROUND OF THE INVENTION

Field of the Invention

An aspect of the present invention relates to a pixel array and an organic light emitting display device including the same. More particularly, an aspect of the present invention relates to a pixel array and an organic light emitting display device including the same, which can display an image with uniform luminance by compensating for a variation in threshold voltage/mobility of a driving transistor for each pixel and compensating for a change in efficiency due to degradation of an organic light emitting diode.

Description of the Related Art

Recently, there have been developed various types of flat panel display devices capable of advantageously reducing the weight and volume of cathode ray tubes. The flat panel display devices include a liquid crystal display device, a field emission display device, a plasma display panel, an organic light emitting display device, and the like.

Among these flat panel display devices, the organic light emitting display device displays images using organic light emitting diodes (OLEDs) that emit light through recombination of electrons and holes. The organic light emitting display device has a faster response speed and is driven with lower power consumption.

The above information disclosed in this Background section is only for enhancement of understanding of the background of the described technology and therefore it may contain information that does not form the prior art that is already known in this country to a person of ordinary skill in the art.

SUMMARY OF THE INVENTION

Embodiments of the present invention provide a pixel array and an organic light emitting display device including the same, which can display an image with uniform luminance by compensating for a variation in threshold voltage/mobility of a driving transistor for each pixel and compensating for a change in efficiency due to degradation of an organic light emitting diode.

According to an aspect of the present invention, there is provided a pixel array including a plurality of pixels. A first pixel among the plurality of pixels includes: an organic light emitting diode; a pixel circuit positioned among an anode electrode of the organic light emitting diode, a first scan line and a first data line through which a data signal is supplied to the first pixel, and controlling current flowing in the organic light emitting diode; and a switching element controlling the coupling between a second data line through which a data signal is supplied to a second pixel of the plurality of pixels and the anode electrode of the organic light emitting diode, in response to a control signal supplied through a control line.

The pixel circuit may include a first transistor coupled between a first power source and the anode electrode of the organic light emitting diode, and having a gate electrode coupled to a first node; a second transistor coupled between the first data line and the first node, and having a gate electrode coupled to the first scan line; and a storage capacitor coupled between the first power source and the first node.

The pixel circuit may further include a third transistor coupled between the first node and the anode electrode of the organic light emitting diode, having a gate electrode coupled to a second scan line.

According to an aspect of the present invention, an organic light emitting display device may include a pixel array having a plurality of pixels arranged at intersection portions of scan lines, data lines and control lines; a scan driver supplying scan signals to the scan lines; a data driver supplying data signals to the data lines; and a control line driver supplying control signals to the control lines. A first pixel among the plurality of pixels includes: an organic light emitting diode; a pixel circuit positioned among an anode electrode of the organic light emitting diode, a corresponding first scan line of the scan lines and a first data line of the data lines, through which a data signal is supplied to the first pixel, and controlling current flowing in the organic light emitting diode; and a switching element controlling the coupling between a second data line through which a data signal is supplied to a second pixel of the plurality of pixels and the anode electrode of the organic light emitting diode, in response to a control signal supplied through a corresponding control line of the control lines.

The pixel circuit may include a first transistor coupled between a first power source and the anode electrode of the organic light emitting diode, and having a gate electrode coupled to a first node; a second transistor coupled between the first data line and the first node, and having a gate electrode coupled to the first scan line; and a storage capacitor coupled between the first power source and the first node.

The pixel circuit may further include a third transistor coupled between the first node and the anode electrode of the organic light emitting diode, having a gate electrode coupled to a second scan line.

The organic light emitting display device may further include a sensing unit sensing degradation information of the organic light emitting diode or threshold voltage/mobility of a driving transistor included in the first pixel, using the second data line; and a switching unit selectively coupling the data lines to the sensing unit.

The sensing unit may include a current sink unit receiving current supplied from the first pixel through the second data line; a current source unit supplying current to the first pixel through the second data line; an analog-digital conversion unit converting a first voltage supplied through the current sink unit into a first digital value, and converting a second voltage supplied through the current source unit into a second digital value; a first switch coupling the current sink unit to the switching unit while the threshold voltage/mobility information of the driving transistor is sensed; and a second switch coupling the current source unit to the switching unit while the degradation information of the organic light emitting diode is sensed.

The switching unit may include a first switch coupling the first data line to the sensing unit; and a second switch coupling the second data line to the sensing unit.

The first and second switches may be turned off during a display period. The first switch may be turned off and the second switch may be turned on while the degradation information of the organic light emitting diode included in the first pixel. The first and second switches may be turned on while the threshold voltage/mobility information of the driving transistor included in the first pixel.

The organic light emitting display device may further include a control block storing degradation information of the organic light emitting diode or threshold voltage/mobility of the driving transistor output from the sensing unit; and a timing controller controlling the scan driver, the data driver and the control line driver, converting bits of data supplied, based on the degradation information or threshold voltage/mobility information stored in the control block, and outputting the converted data to the data driver.

The control block may include a memory storing degradation information of the organic light emitting diode or threshold voltage/mobility information of the driving transistor; and a controller providing the timing controller with the degradation information of the organic light emitting diode or threshold voltage/mobility information of the driving transistor.

In the pixel array and the organic light emitting display device according to embodiments of the present invention, an image with uniform luminance may be displayed by compensating for a variation in threshold voltage/mobility of a driving transistor for each pixel and compensating for a change in efficiency due to degradation of an organic light emitting diode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
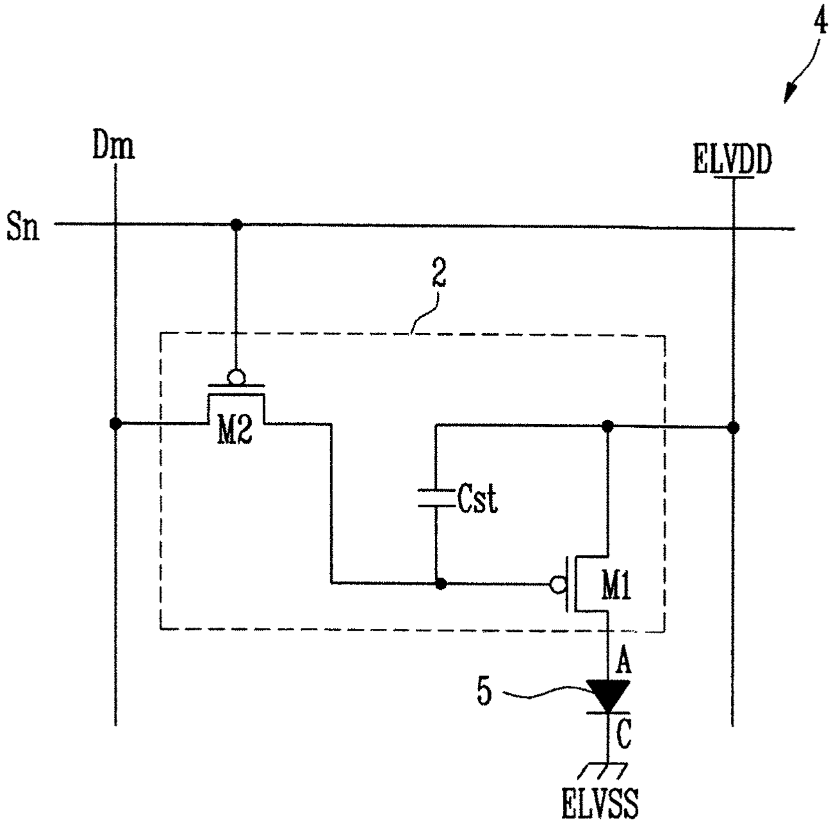
FIG. 1 is a circuit diagram illustrating a pixel of a contemporary organic light emitting display device.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a circuit diagram illustrating a pixel of a contemporary organic light emitting display device.

In reference to FIG. 1, the pixel 4 of the contemporary organic light emitting display device includes an OLED 5 and a pixel circuit 2. The pixel circuit 2 is coupled to a data line Dm and a scan line Sn, and controls the OLED 5, corresponding to a data signal supplied through the data line Dm and a scan signal supplied through the scan line Sn.

An anode electrode A of the OLED 5 is coupled to the pixel circuit 2, and a cathode electrode C of the OLED 5 is coupled to a second power source ELVSS. The OLED 5 generates light with luminance corresponding to the amount of current supplied from the pixel circuit 2.

The pixel circuit 2 supplies, to the OLED 5, current having an amount corresponding to the data signal supplied through the data line Dm, in response to the scan signal supplied through the scan line Sn. To this end, the pixel circuit 2, as shown in FIG. 1, includes a first transistor M1, a second transistor M2 and a storage capacitor Cst.

The first transistor M1 is coupled among the second transistor M2, a first power source ELVDD and the OLED 5. Specifically, a gate electrode of the first transistor M1 is coupled to one terminal of the storage capacitor Cst. A first electrode of the first transistor M1 is coupled to the other terminal of the storage capacitor Cst and the first power source ELVDD, and a second electrode of the first transistor M1 is coupled to the anode electrode A of the OLED 5.

Here, the first electrode is set as any one of source and drain electrodes, and the second electrode is set as an electrode different from the first electrode, i.e., the other of the source and drain electrodes. For example, when the first electrode is set as a source electrode, the second electrode is set as a drain electrode.

The second transistor M2 is coupled among the first transistor M1, the data line Dm and the scan line Sn. Specifically, a gate electrode of the second transistor M2 is coupled to the scan line Sn. A first electrode of the second transistor M2 is coupled to the data line Dm, and a second electrode of the second transistor M2 is coupled to the one terminal of the storage capacitor Cst.

When the scan signal is supplied through the scan line Sn, the second transistor M2 is turned on to supply the data signal supplied through the data line Dm to the storage capacitor Cst. In this case, the storage capacitor Cst charges a voltage corresponding to the data signal.

The first transistor M1 controls the amount of current from the first power source ELVDD to the second power source ELVSS via the OLED 5, based on the voltage between both the terminals of the storage capacitor Cst. In this case, the OLED 5 generates light with luminance corresponding to the amount of current supplied from the first transistor M1.

In the contemporary organic light emitting display device, an image with uniform luminance may not be displayed due to the non-uniformity of threshold voltage/mobility of a driving transistor, e.g., the first transistor M1, and the luminance may not be uniform according to emission efficiency of the OLED. Further, an image with a desired luminance cannot be displayed due to a change in efficiency, caused by degradation of the OLED.

Figure 2:
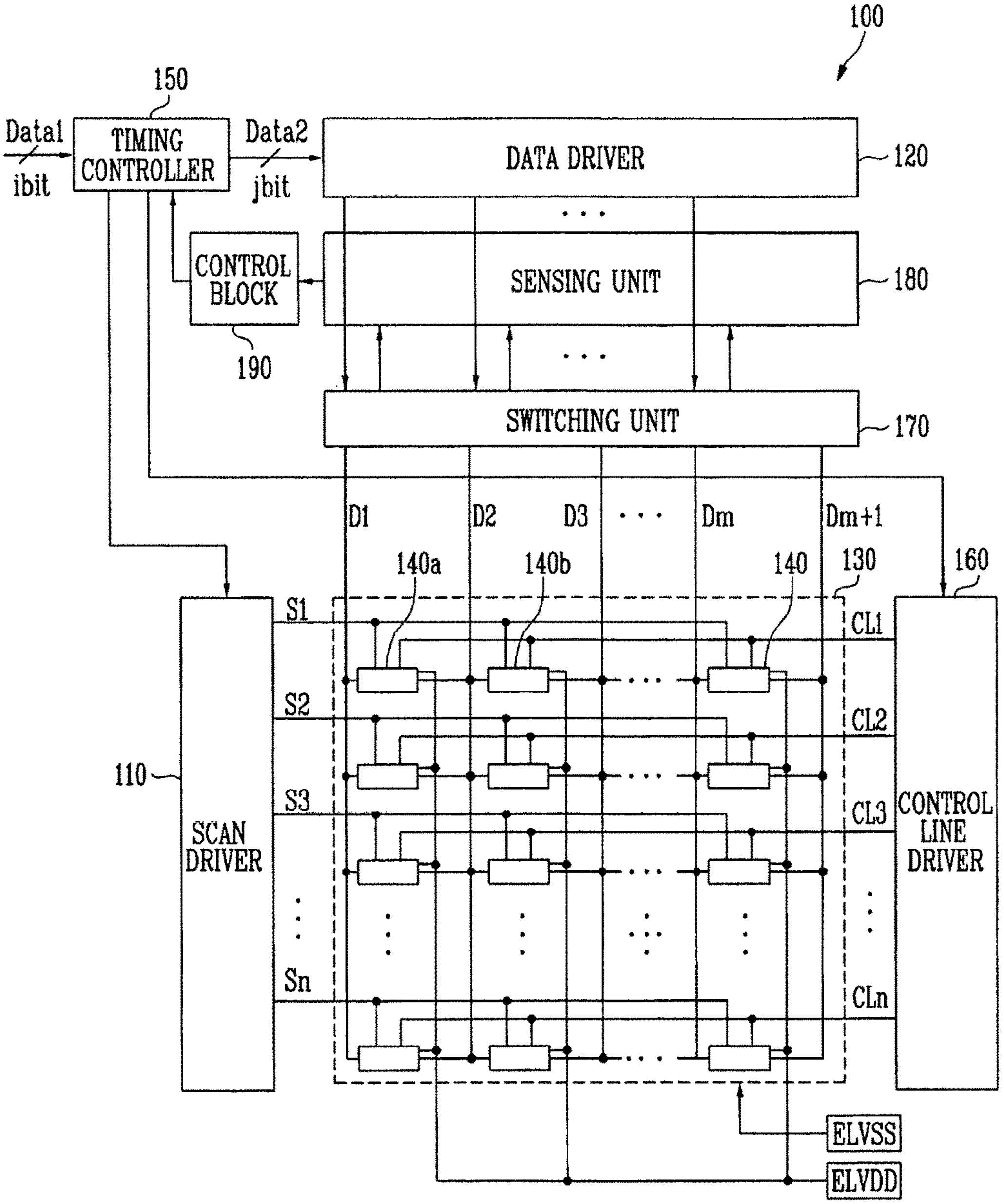
FIG. 2 is a block diagram illustrating an organic light emitting display device according to an embodiment of the present invention.

FIG. 2 is a block diagram illustrating an organic light emitting display device according to an embodiment of the present invention.

In reference to FIG. 2, the organic light emitting display device 100 according to an embodiment of the present invention includes a scan driver 110, a data driver 120, a pixel array 130, a timing controller 150, a control line driver 160, a switching unit 170, a sensing unit 180 and a control block 190.

The scan driver 110 supplies a scan signal to the pixel array 130 through scan lines S1 to Sn under the control of the timing controller 150. According to this embodiment, the scan driver 110 progressively supplies the scan signal to the scan lines S1 to Sn.

The data driver 120 supplies, to the pixel array 130, data signals corresponding to second data Data2 output from the timing controller 150 through data lines D1 to Dm under the control of the timing controller 150.

The pixel array 130 includes a plurality of pixels 140 arranged at intersection portions of the scan lines S1 to Sn, the data lines D1 to Dm and control lines CL1 to CLn. Each pixel 140 receives a first power source ELVDD and a second power source ELVSS, supplied from the outside of the pixel array 130, and generates light with luminance corresponding to the data signal supplied to a corresponding data line among the data lines D1 to Dm when the scan signal is supplied to a corresponding scan line among the scan lines S1 to Sn during a display period.

For convenience of illustration, the period of outputting an image using the pixels is referred to as a 'display period,' and the period of sensing threshold voltage/mobility information of a driving transistor or degradation information of an organic light emitting diode (OLED) included in each pixel is referred to as a 'sensing period.'

During the sensing period, each pixel 140 outputs, to the sensing unit 180, the threshold voltage/mobility information of the driving transistor or degradation information of the OLED included in the pixel 140, through a data line corresponding to another pixel. To this end, each pixel 140 is coupled between the data line corresponding to the pixel 140 and the data line corresponding to another pixel.

In other words, two pixels of the plurality of pixels 140 share the same data line with each other. During the sensing period, threshold voltage/mobility information of a driving transistor or degradation information of an OLED included in any one of the two pixels is output to the sensing unit 180 through the shared data line. According to an embodiment, the two pixels may be pixels closest to each other, but the technical spirit of the present invention is not limited thereto.

For example, a first pixel 140*a* is coupled between the first and second data lines D1 and D2, and a second pixel 140*b* is coupled between the second and third data lines D2 and D3. That is, the first and second pixels 140*a* and 140*b* share the second data line D2 with each other.

During the display period, the first pixel 140*a* receives a data signal supplied through the first data line D1, and the second pixel 140*b* receives a data signal supplied through the second data line D2.

During the sensing period, the first pixel 140*a* outputs threshold voltage/mobility information of a driving transistor or degradation information of an OLED included in the first pixel 140*a* through the second data line D2 shared with the second pixel 140*b*. Similarly, the second pixel 140*b* outputs threshold voltage/mobility information of a driving transistor or degradation information of an OLED included in the second pixel 140*b* through the third data line.

The timing controller 150 controls the data driver 120, the scan driver 110 and the control line driver 160. The timing controller 150 generates a second data Data2 by converting bits of a first data Data1, based on information supplied from the control block 190. In this case, the first data Data1 is set to i (i is a natural number) bits, and the second data Data2 is set to j (j is a natural number of i or more) bits.

The timing controller 150 outputs the generated second data Data2 to the data driver 120. The data driver 120 generates data signals, based on the second data Data2, and supplies the generated data signals to the pixel array 130 through the data lines D1 to Dm.

The control line driver 160 progressively supplies control signals through the control lines CL1 to CLn under the control of the timing controller 150.

The switching unit 170 controls the coupling between the sensing unit 180 and the data lines D1 to Dm. Specifically, when the threshold voltage/mobility information of the driving transistor or degradation information of the OLED included in any one of the plurality of pixels 140 is output through a data line corresponding to another pixel of the plurality of pixels 140 during the sensing period, the switching unit 170 couples the data line corresponding to the another pixel to the sensing unit 180.

For example, when the threshold voltage/mobility information of the driving transistor or degradation information of the OLED included in the first pixel 140*a* is output through the second data line D2 during the sensing period, the switching unit 170 couples the second data line D2 to the sensing unit 180. On the contrary, the switching unit 170 blocks the coupling between the pixel array 130 and the sensing unit 180 during the display period.

The sensing unit 180 extracts degradation information of the OLED included in each pixel 140, and supplies the extracted degradation information to the control block 190. The sensing unit 180 extracts threshold voltage/mobility information of the driving transistor included in each pixel 140, and supplies the extracted threshold voltage/mobility information to the control block 190.

The control block 190 stores the degradation information or threshold voltage/mobility information supplied from the sensing unit 180. The control block 190 stores the degradation information of the OLEDs or threshold voltage/mobility of the driving transistors included in all the pixels.

Functions and operations of the data driver 120, the pixel array 130, the switching unit 170, the sensing unit 180 and the control block 190 will be described in detail later.

Figure 3:
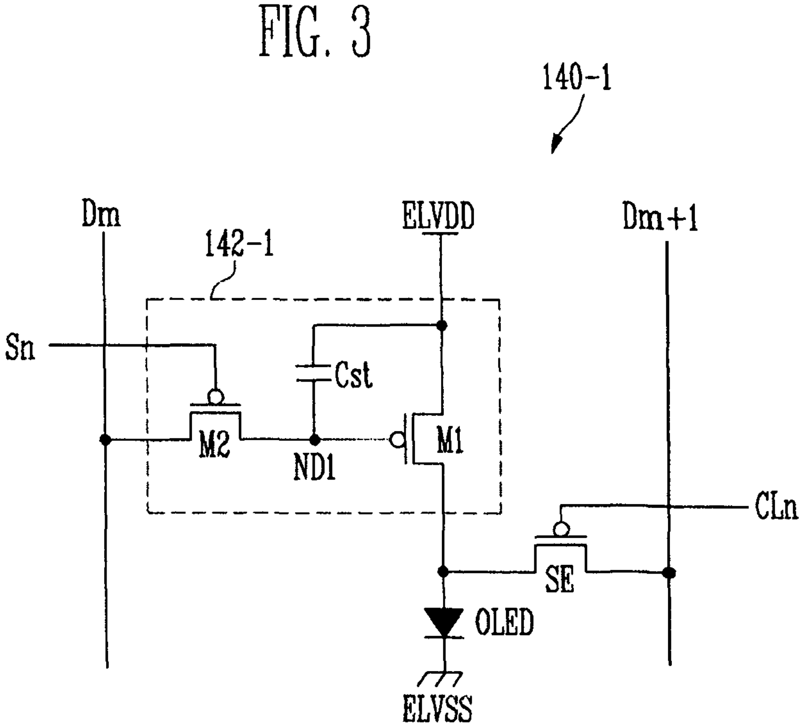
FIG. 3 is a circuit diagram illustrating an embodiment of a pixel shown in FIG. 2.

FIG. 3 is a circuit diagram illustrating an embodiment of a pixel shown in FIG. 2. For convenience of illustration, only a pixel 140-1 coupled between an m-th data line Dm and an (m+1)-th data line Dm+1 and coupled to an n-th scan line Sn is shown in FIG. 3. In reference to FIGS. 2 and 3, the pixel 140-1 includes a pixel circuit 142-1, an OLED and a switching element SE.

During the display period, the pixel circuit 142-1 supplies current to the OLED, in response to a scan signal supplied from the n-th scan line Sn and a data signal supplied from the m-th data line Dm. Specifically, during the display period, the pixel circuit 142-1 supplies, to the OLED, current corresponding to the data signal supplied from the m-th data line Dm, when the scan signal is supplied through the n-th scan line Sn.

During the sensing period, the pixel circuit 142-1 outputs threshold voltage/mobility information of a driving transistor, e.g., a first transistor M1 or degradation information of the OLED through the (m+1)-th data line Dm+1.

The pixel circuit 142-1 includes the first transistor M1, a second transistor M2 and a storage capacitor Cst.

A gate electrode of the first transistor M1 is coupled to a first node ND1. A first terminal of the first transistor M1 is coupled to the first ELVDD, and a second terminal of the first transistor M1 is coupled to the OLED. During the display period, the first transistor M1 controls the amount of current flowing from the first power source ELVDD to the second power source ELVSS via the OLED, corresponding to a voltage stored in the storage capacitor Cst.

A gate electrode of the second transistor M2 is coupled to the n-th scan line Sn. A first terminal of the second transistor M2 is coupled to the m-th data line Dm, and a second terminal of the second transistor M2 is coupled to the first node ND1. The second transistor M2 controls the coupling between the m-th data line Dm and the first node ND1, in response to the scan signal supplied through the n-th scan line Sn. During the display period, the second transistor M2 allows a voltage corresponding to that of the data signal supplied through the m-th data line Dm to be charged in the storage capacitor Cst, in response to the scan signal supplied through the n-th scan line Sn.

The storage capacitor Cst is coupled between the first power source ELVDD and the first node ND1. When the second transistor M2 is turned on in response to the scan signal supplied from the n-th scan line Sn, the storage capacitor Cst charges a voltage corresponding to that of the data signal supplied from the m-th data line Dm. In this case, the first transistor M1 controls the amount of current flowing from the first power source ELVDD to the second power source ELVSS via the OLED, corresponding to the voltage between both terminals of the storage capacitor Cst.

The OLED generates light with luminance corresponding to the amount of the current supplied from the first transistor M1.

The switching element SE controls the coupling between an anode electrode of the OLED and the (m+1)-th data line Dm+1, in response to a control signal supplied through an n-th control line CLn. Specifically, during the sensing period, the switch element SE outputs the threshold voltage/mobility of the driving transistor, e.g., the first transistor M1 or degradation information of the OLED through the (m+1)-th data line Dm+1, in response to the control signal supplied through the n-th control line CLn.

Figure 4:
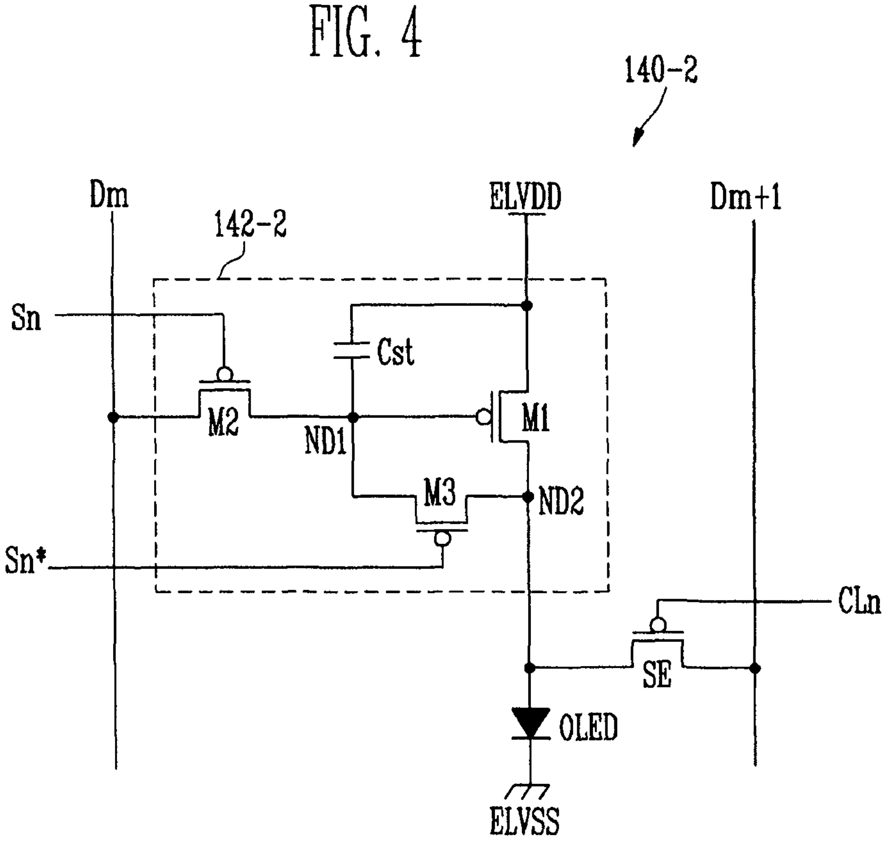
FIG. 4 is a circuit diagram illustrating another embodiment of the pixel shown in FIG. 2.

FIG. 4 is a circuit diagram illustrating another embodiment of the pixel shown in FIG. 2. The function and operation of the pixel 140-2 shown in FIG. 4, except a third transistor M3, are substantially identical to those of the pixel 140-1 shown in FIG. 3, and therefore, their detailed descriptions will be omitted.

Referring to FIGS. 2 and 4, a gate electrode of the third transistor M3 is coupled to an n*-th scan line Sn*. A first electrode of the third transistor M3 is coupled to the first node ND1, and a second electrode of the third transistor M3 is coupled to a second node ND2, i.e., a node between the first transistor M1 and the OLED. That is, the third transistor M3 controls the coupling between the first and second nodes ND1 and ND2, in response to an n*-th scan signal supplied through the n*-th scan line Sn*.

In this case, the n*-th scan line Sn* may be the n-th scan line Sn, an (n−1)-th scan line or an (n+1)-th scan line, but the technical spirit of the present invention is not limited thereto. The signal supplied through the n-th scan line Sn and the scan line supplied through the n*-th scan line Sn* may be the same signal or signals progressively supplied. For example, the signal supplied through the n-th scan line Sn and the scan line supplied through the n*-th scan line Sn* may be progressively supplied during the display period, and may be identical to each other during the sensing period.

Figure 5:
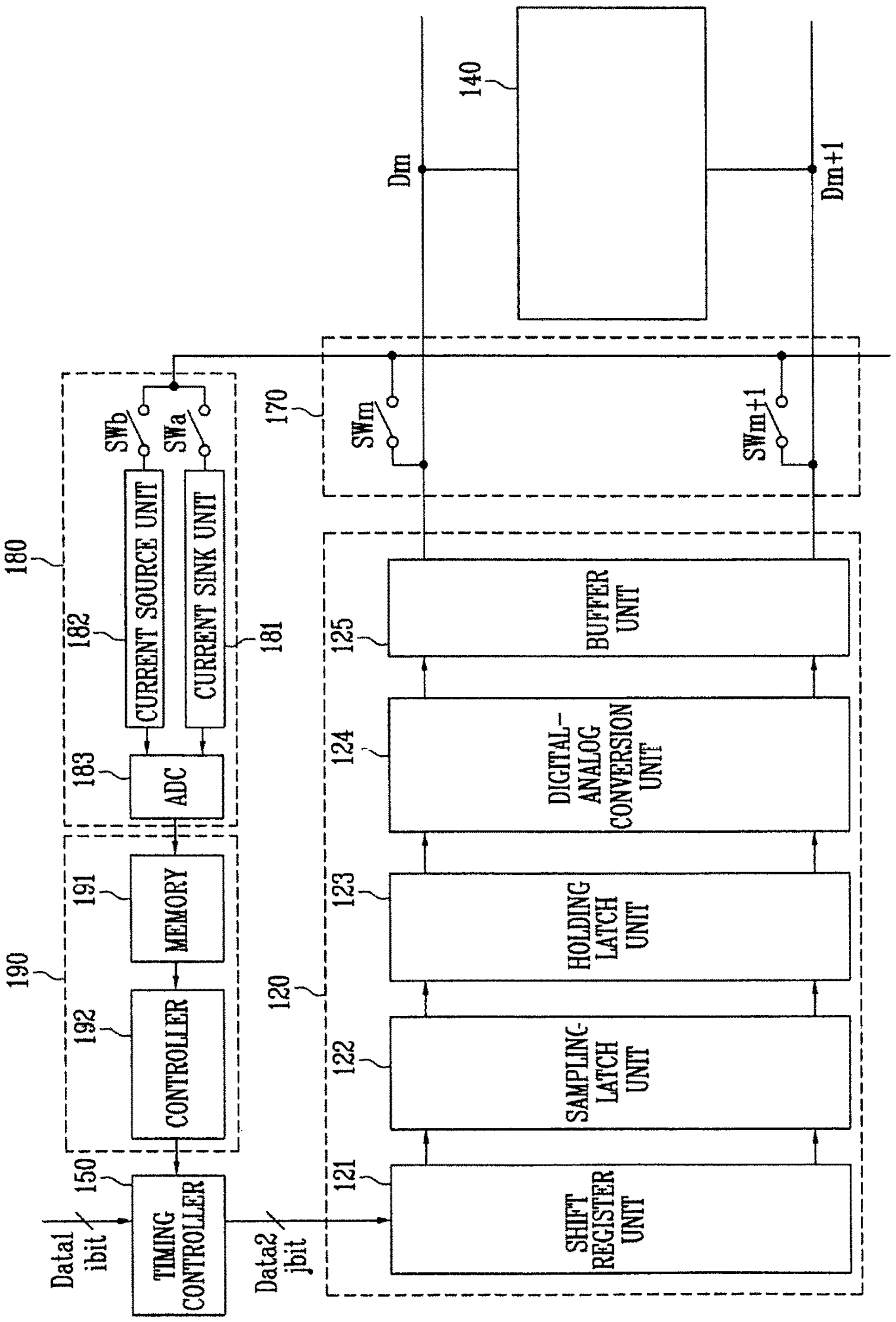
FIG. 5 is a block diagram specifically illustrating a scan driver, a switching unit, a sensing unit and a control block, shown in FIG. 2.

FIG. 5 is a block diagram specifically illustrating the scan driver, the switching unit, the sensing unit and the control block, shown in FIG. 2. For convenience of illustration, only one pixel 140 of the plurality of pixels and two data lines Dm and Dm+1 of the plurality of data lines have been illustrated in FIG. 5, but the technical spirit of the present invention is not limited thereto.

In reference to FIG. 5, the data driver 120 includes a shift register unit 121, a sampling latch unit 122, a holding latch unit 123, a digital-analog conversion unit 124 and a buffer unit 125.

The shift register unit 121 receives a second data Data2 from the timing controller 150, and outputs a plurality of sampling signals to the sampling latch unit 122, based on the received second data Data2.

The sampling latch unit 122 progressively stores the second data Data2, in response to the plurality of sampling signals progressively supplied from the shift register unit 121.

The holding latch unit 123 stores a plurality of sampling signals output from the sampling latch unit 122, in response to a source output enable signal output from the timing controller 150. The holding latch unit 123 outputs, to the digital-analog conversion unit 124, the plurality of sampling signals stored therein.

The digital-analog conversion unit 124 receives a plurality of sampling signals from the holding latch unit 123, and generates a plurality of data signals respectively corresponding to the plurality of received sampling signals. The digital-analog conversion unit 124 may be implemented with a plurality of digital-to-analog converters (hereinafter, referred to as "DACs"). That is, the digital-analog conversion unit 124 generates a plurality of data signals, using the DACs respectively corresponding to a plurality of channels, and outputs the generated data signals to the buffer unit 125.

The buffer unit 125 supplies, to the pixel array 130, the plurality of data signals supplied from the digital-analog conversion unit 124, through the plurality of data lines. For example, the buffer unit 125 supplies, to an m-th pixel 140, a data signal corresponding to the pixel 140, through the m-th data line Dm. Similarly, the buffer unit 125 supplies, to the pixel 140, a data signal corresponding to an (m+1)-th pixel (not shown), through the (m+1)-th data line Dm+1.

The switching unit 170 includes a plurality of switches. Each switch controls the coupling between any one of the plurality of data lines and the sensing unit 180, under the control of the outside, e.g., the data driver 120 or the control line driver 160. For convenience of illustration, only an m-th switch SWm and an (m+1)-th switch SWm+1 have been illustrated in FIG. 5, but the technical spirit of the present invention is not limited thereto.

For example, the m-th switch SWm controls the coupling between the m-th data line Dm and the sensing unit 180, and the (m+1)-th switch SWm+1 controls the coupling between the (m+1)-th data line Dm+1 and the sensing unit 180. The operations of the m-th switch SWm and the (m+1)-th switch SWm+1 will be described later.

The sensing unit 180 includes a plurality of switches SWa and SWb, a current sink unit 181, a current source unit 182 and an ADC (Analog-to-Digital Converter) 183.

The first switch SWa controls the coupling between the current sink unit 181 and the switching unit 170. Specifically, the first switch SWa is turned on when the threshold voltage/mobility information of the driving transistor, e.g., the first transistor M1 is sensed.

The second switch SWb controls the coupling between the current source unit 182 and the switching unit 170. Specifically, the second switch SWb is turned on when the degradation information of the OLED is sensed.

When the first switch SWa is turned on, the current sink unit 181 receives a predetermined current supplied from the m-th pixel 140, and senses the threshold voltage/mobility information of the driving transistor included in the m-th pixel 140, using the supplied current. In other words, when the first switch SWa is turned on, the current sink unit 181 receives a predetermined current supplied from the m-th pixel 140 through the switching unit 170, and outputs, to the ADC 183, a first voltage V1 corresponding to the supplied current.

When the second switch SWb is turned on, the current source unit 182 senses the threshold voltage information of the OLED while supplying a predetermined current to the m-th pixel 140. In other words, the current source unit 182 supplies a predetermined current to the OLED of the m-th pixel 140 through the switching unit 170, and outputs, to the ADC 183, a voltage V2 between both terminals of the OLED included in the m-th pixel 140.

The functions and operations of the plurality of switches SWa and SWb, the current sink unit 181 and the current source unit 182 will be described later.

The ADC 183 converts the first voltage V1 supplied from the current sink unit 181 into a first digital value, and converts the second voltage V2 supplied from the current source unit 182 into a second digital value.

The control block 190 includes a memory 191 and a controller 192.

The memory 191 stores the first and second digital values supplied from the ADC 183. Here, the memory 191 stores first and second digital values of each of all the pixels 140 included in the pixel array 130. According to an embodiment, the memory 191 may be implemented as a frame memory.

The controller 192 provides the timing controller 150 with the first and second digital values stored in the memory 191. Here, the controller 192 provides the timing controller 150 with first and second digital values extracted from the pixel 140 to which the first data Data1 input to the timing controller 150 is to be supplied.

Figure 6A:
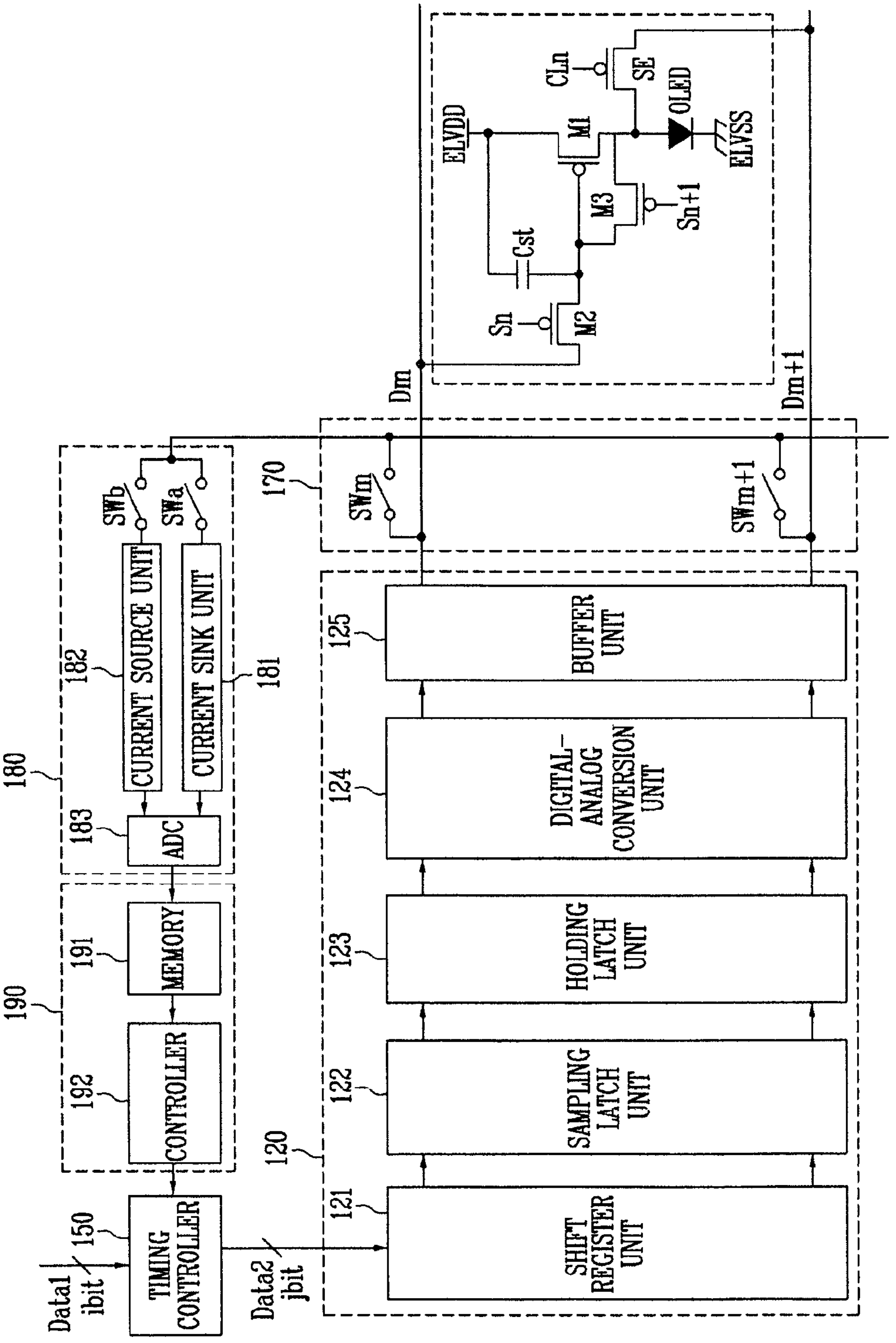
FIGS. 6A through 6C are block diagrams illustrating an operation of the organic light emitting display device including the pixel shown in FIG. 4.
Figure 6B:
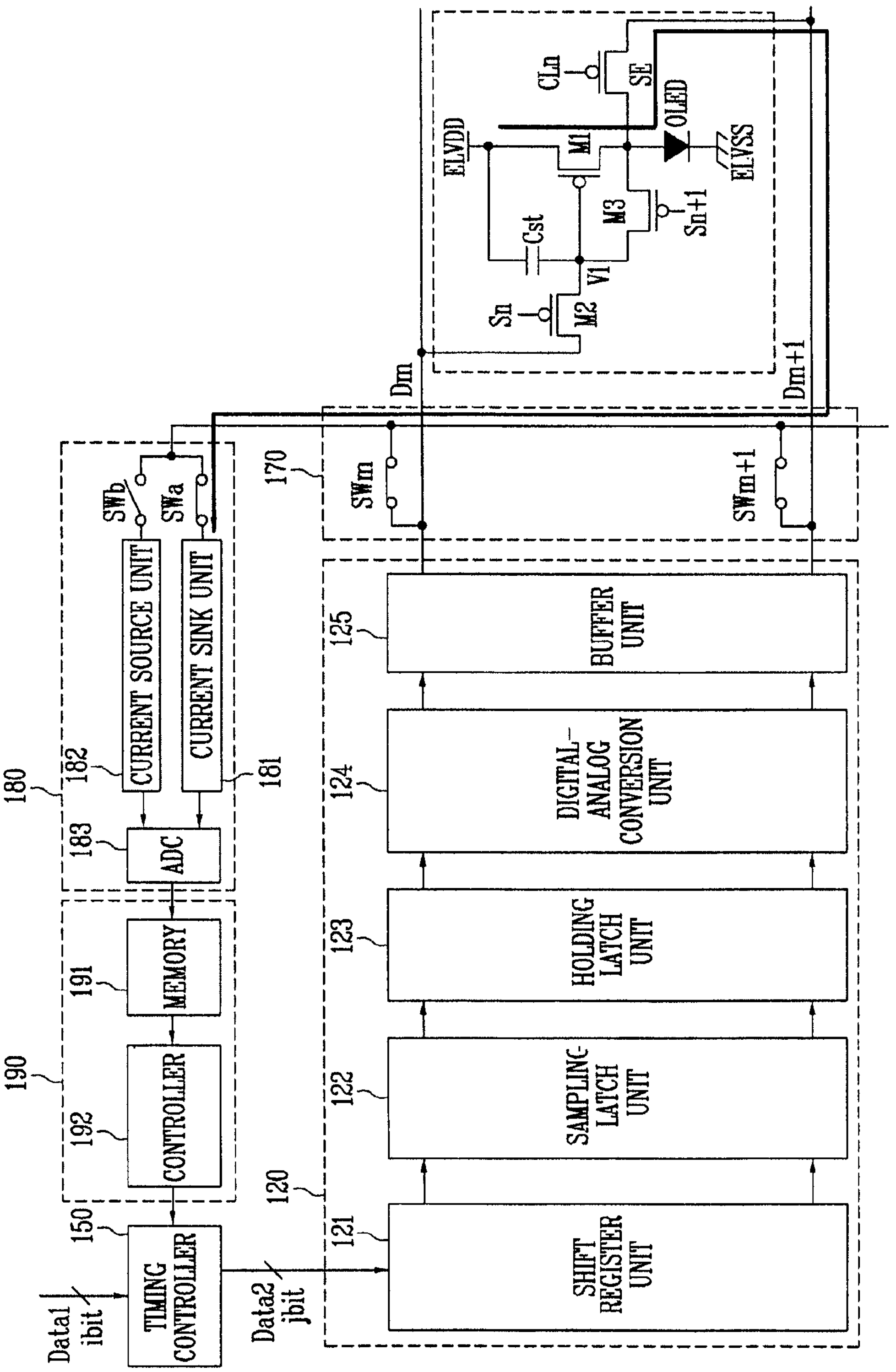
Figure 6C:
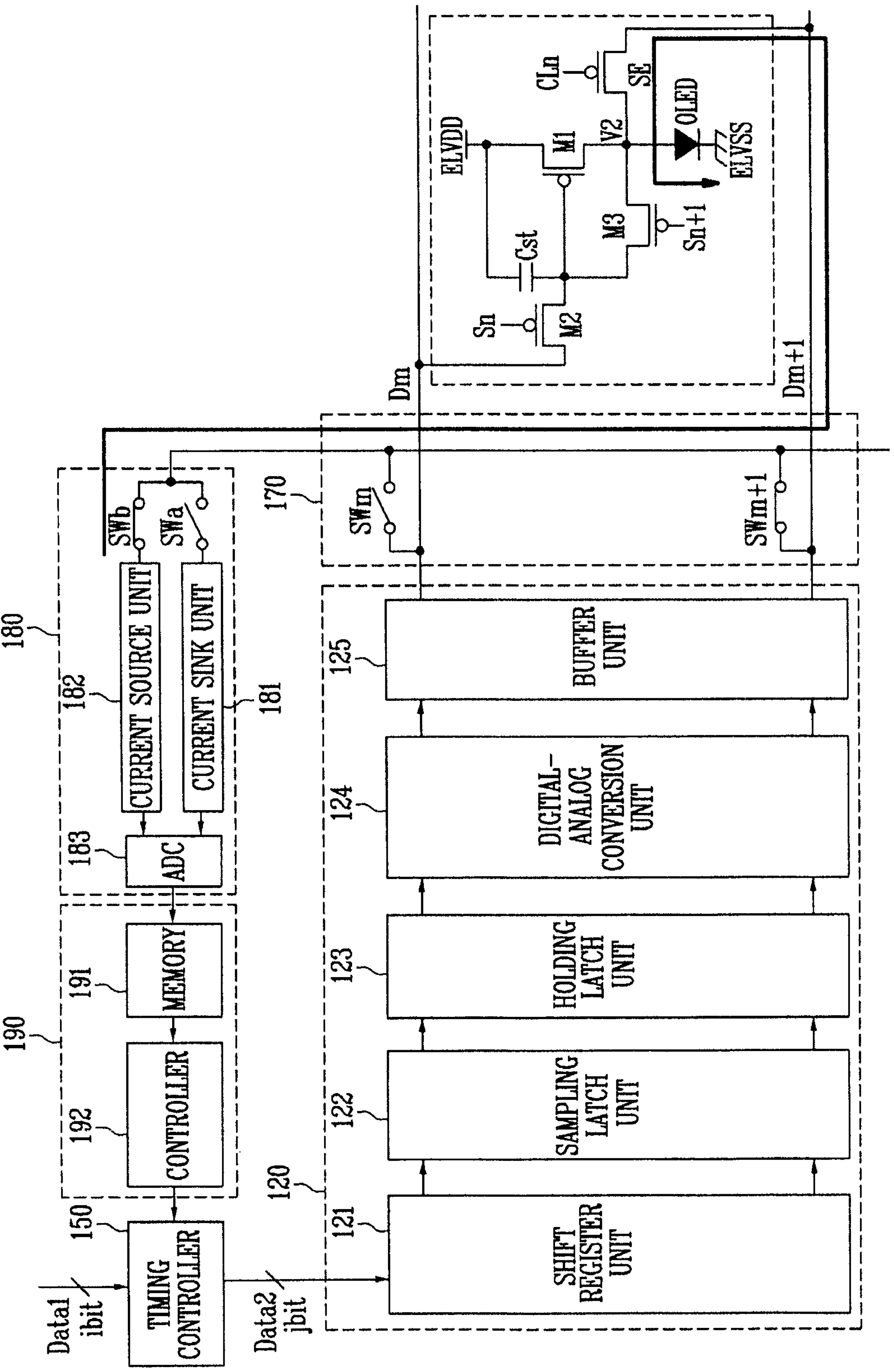
Figure 7A:
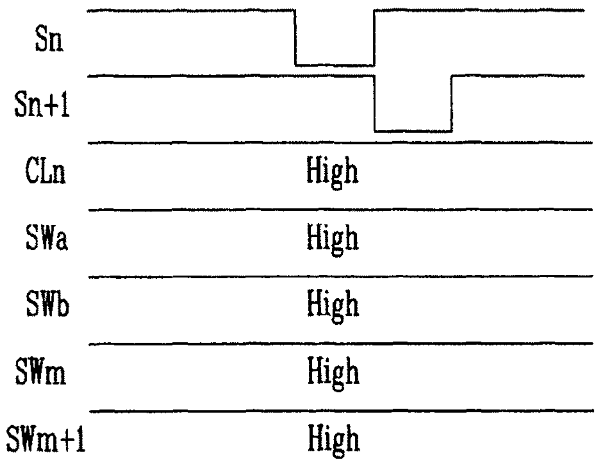
FIGS. 7A through 7C are waveform diagrams illustrating signals supplied to the organic light emitting display device, respectively shown in FIGS. 6A through 6C.
Figure 7B:
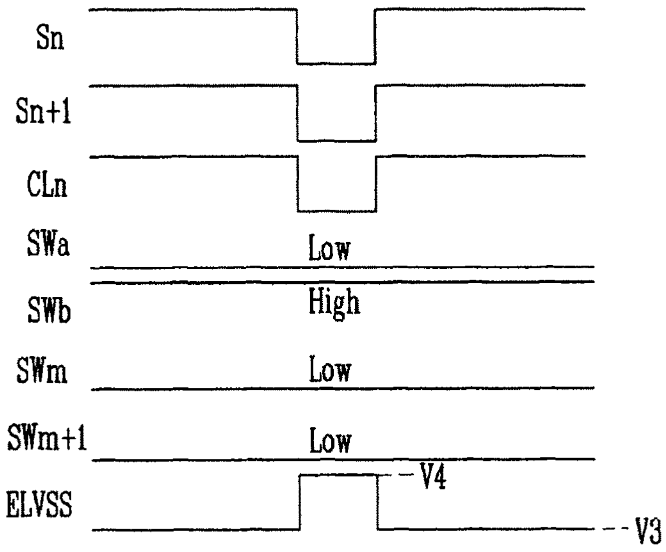
Figure 7C:
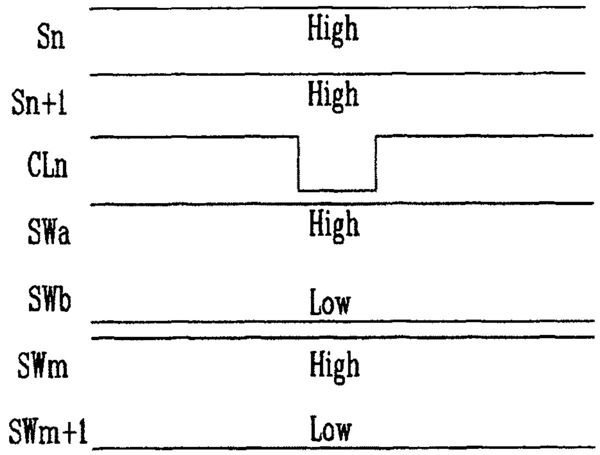

FIGS. 6A through 6C are block diagrams illustrating an operation of the organic light emitting display device including the pixel shown in FIG. 4. FIGS. 7A through 7C are waveform diagrams illustrating signals supplied to the organic light emitting display device, respectively shown in FIGS. 6A through 6C. For convenience of illustration, the organic light emitting display device including the pixel shown in FIG. 4 has been illustrated in FIGS. 6A through 6C, but the technical spirit of the present invention is not limited thereto. For example, the structure of the pixel may be varied.

Waveforms when each of the second transistor M2, the third transistor M3, the switching element SE, the first switch SWa, the second switch SWb, the m-th switch SWm and the (m+1)-th switch SWm+1 is implemented as a p-type transistor have been illustrated in FIGS. 7A through 7C, but the technical spirit of the present invention is not limited thereto. For example, when each of the second transistor M2, the third transistor M3, the switching element SE, the first switch SWa, the second switch SWb, the m-th switch SWm and the (m+1)-th switch SWm+1 is implemented as an n-type transistor, the waveforms of FIGS. 7A through 7C may be reversed.

FIGS. 6A and 7A are respectively block and waveform diagrams illustrating an operation of the organic light emitting display device during the display period. In reference to FIGS. 6A and 7A, the switching element SE is turned off, in response to a control signal supplied through the n-th control line CLn during the display period. Each of the first switch SWa, the second switch SWb, the m-th switch SWm and the (m+1)-th switch SWm+1 is turned off during the display period.

The second transistor M2 is turned on, in response to a scan signal supplied through the n-th scan line Sn. If the second transistor M2 is turned on, a voltage corresponding to that of a data signal supplied through the m-th data line Dm is stored in the storage capacitor Cst, and current having an amount corresponding to the voltage stored in the storage capacitor Cst flows from the first power source ELVDD to the second power source ELVSS via the OLED.

The OLED generates light with luminance corresponding to the amount of the current.

Although only the scan signal supplied through the n-th scan line Sn and the scan signal supplied through the (n+1)-th scan line Sn+1 have been illustrated in FIG. 7A, the scan driver 110 progressively supplies scan signals through the plurality of scan lines.

FIGS. 6B and 7B are respectively block and waveform diagrams illustrating an operation of the organic light emitting display device during the sensing period, particularly the period of sensing the threshold voltage/mobility of the driving transistor, e.g., the first transistor M1.

In reference to FIGS. 6B and 7B, during the period of sensing the threshold voltage/mobility of the first transistor M1, the first switch SWa, the m-th switch SWm and the (m+1)-th switch SWm+1 are turned on, and the second switch SWb is turned off.

The second transistor M2 is turned on, in response to the scan signal supplied through the n-th scan line, and the third transistor M3 is turned on, in response to the scan signal supplied through the (n+1)-th scan line Sn+1. The switching element SE is turned on, in response to the control signal supplied through the n-th control line CLn. During the period of sensing the threshold voltage/mobility of the first transistor M1, the scan signal supplied through the n-th scan line Sn, the scan signal supplied through the (n+1)-th scan line Sn+1 and the control signal supplied through the n-th control line CLn are preferably synchronized, thereby simultaneously turning on the second transistor M2, the third transistor M3 and the switching element SE. However, the technical spirit of the present invention is not limited thereto.

During the period of turning on the second transistor M2, the third transistor M3 and the switching element SE, the voltage of the second power source ELVSS is raised from a third voltage V3 to a fourth voltage V4. Here, the third voltage V3 may be set to a ground voltage, and the fourth voltage V4 may be set to a voltage at which current does not flow in the OLED.

In this case, current flows from the first power source ELVDD to the current sink unit 181 via the first transistor M1, the switching element SE, the (m+1)-th switch SWm+1 and the first switch SWa, and the current sink unit 181 outputs the first voltage V1 to the ADC 183, thereby sensing the threshold voltage/mobility of the first transistor M1.

FIGS. 6C and 7C are respectively block and waveform diagrams illustrating an operation of the organic light emitting display device during the sensing period, particularly the period of sensing degradation information of the OLED.

In reference to 6C and 7C, during the period of sensing the degradation information of the OLED, the first switch SWa and the m-th switch SWm are turned off, and the second switch SWb and the (m+1)-th switch SWm+1 are turned on. The second transistor M2 is turned on, in response to the scan signal supplied through the n-th scan line Sn, and the third transistor M3 is turned off, in response to the scan signal supplied through the (n+1)-th scan line Sn+1.

The switching element SE is turned on, in response to the control signal supplied through the n-th control line CLn. While the switching element is turned on, the current source unit 182 supplies current to the OLED through the switching element SE and outputs the second voltage V2 to the ADC 183, thereby sensing the degradation information of the OLED.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display panel, comprising:

a plurality of scan lines;

a plurality of control lines;

a plurality of data lines; and a pixel array having a plurality of pixels, the pixels comprising a first pixel and a second pixel, wherein the first pixel comprises:

an organic light emitting diode coupled between a first electrode and a second electrode, a pixel circuit having a driving transistor, a first switch configured to couple a first data line of the plurality of data lines to the pixel circuit in response to a first control signal supplied through a first scan line of the plurality of scan lines, and a second switch configured to couple a second data line of the plurality of data lines to the first electrode in response to a second control signal supplied through first control line of the plurality of control lines, the second data line being coupled to a first switch of the second pixel.

2. The display panel of claim 1, wherein the first pixel is in a kth column and the second pixel is in (k+1)th column in the pixel array, where k is a natural number.

3. The display panel of claim 1, wherein the first switch is turned on during a display period.

4. The display panel of claim 1, wherein the second switch is turned on during a sensing period.

5. The display panel of claim 1, wherein the first scan line and the first control line are arranged in a same pixel row.

6. The display panel of claim 1, wherein the driving transistor is coupled between a first power source and the first electrode and has a gate electrode coupled to the first switch.

7. The display panel of claim 6, wherein the pixel circuit further comprises a storage capacitor coupled between the first power source and the gate electrode of the driving transistor.

8. The display panel of claim 6, wherein the pixel circuit further comprises a third switch coupled between the gate electrode of the driving transistor and the first electrode, and the third switch is turned on in response to a third control signal supplied through a second scan line of the plurality of scan lines.

9. A method of driving a display panel, comprising:

extracting characteristic information of a driving transistor included in a first pixel coupled to a first, data line and a second data line while sinking current through the second data line from the driving transistor;

extracting degradation information of an organic light emitting diode included in the first pixel while supplying current to the organic light emitting diode through the second data line;

generating a second data by converting a first data to be supplied to the first pixel by using the characteristic information and the degradation information;

generating a data signal based on the second data; and supplying the data signal to the first pixel through the first data line.

* * * * *